(12) United States Patent
Oyama et al.

(10) Patent No.: US 6,357,876 B1
(45) Date of Patent: Mar. 19, 2002

(54) MULTIFOCAL OCULAR LENS HAVING INTERMEDIATE-DISTANCE VISION CORRECTION REGION FORMED IN CENTRAL PART OF VISION CORRECTION AREA

(75) Inventors: Hiroyuki Oyama, Kakamigahara; Hideaki Kondou, Okazaki; Kazuya Miyamura, Aichi-ken, all of (JP)

(73) Assignee: Menicon Co., Ltd., Nagoya (JP)

(*) Notice: Subject to any disclaimer, the term of this patent is extended or adjusted under 35 U.S.C. 154(b) by 0 days.

(21) Appl. No.: 09/416,759

(22) Filed: Oct. 12, 1999

(30) Foreign Application Priority Data

Oct. 16, 1998 (JP) .......................................... 10-294999

(51) Int. Cl.$^7$ ................................................ G02C 7/04
(52) U.S. Cl. ...................................... 351/161; 351/177
(58) Field of Search ...................... 351/160 R, 160.61, 351/161, 162, 177

(56) References Cited

U.S. PATENT DOCUMENTS

| | | | |
|---|---|---|---|
| 4,580,882 A | 4/1986 | Nuchman et al. | 351/161 |
| 5,002,382 A | * 3/1991 | Seidner | 351/161 |
| 5,691,797 A | 11/1997 | Seidner et al. | 351/161 |

FOREIGN PATENT DOCUMENTS

| | | |
|---|---|---|
| JP | 63-95415 | 4/1988 |
| JP | 1-319729 | 12/1989 |
| JP | 2-217818 | 8/1990 |
| JP | 5-181096 | 7/1993 |
| JP | 9-26559 | 1/1997 |
| WO | 92/22264 | 12/1992 |

* cited by examiner

Primary Examiner—Scott J. Sugarman
(74) Attorney, Agent, or Firm—Burr & Brown

(57) ABSTRACT

A multifocal ocular lens having a vision correction area including at least one distant vision correction region having a first optical power value for distant vision correction and at least one near vision correction region having a second optical power value for near vision correction, wherein the vision correction area further includes a central intermediate-distance vision correction region which has a third optical power value for intermediate vision correction between the first and second optical power values and which is located in a central portion of the vision correction area such that the distant and near vision correction regions are located radially outwardly of the central intermediate-distance vision correction region.

42 Claims, 11 Drawing Sheets

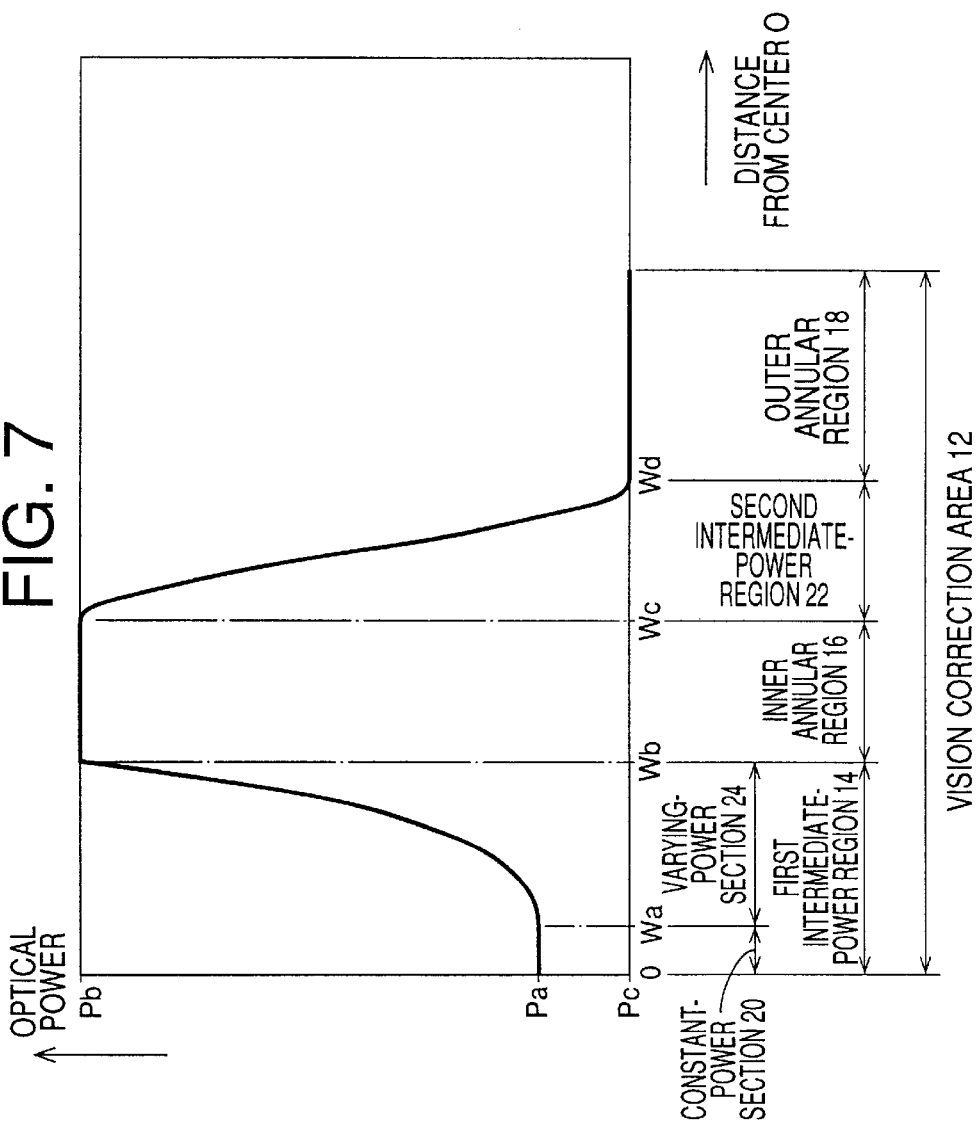

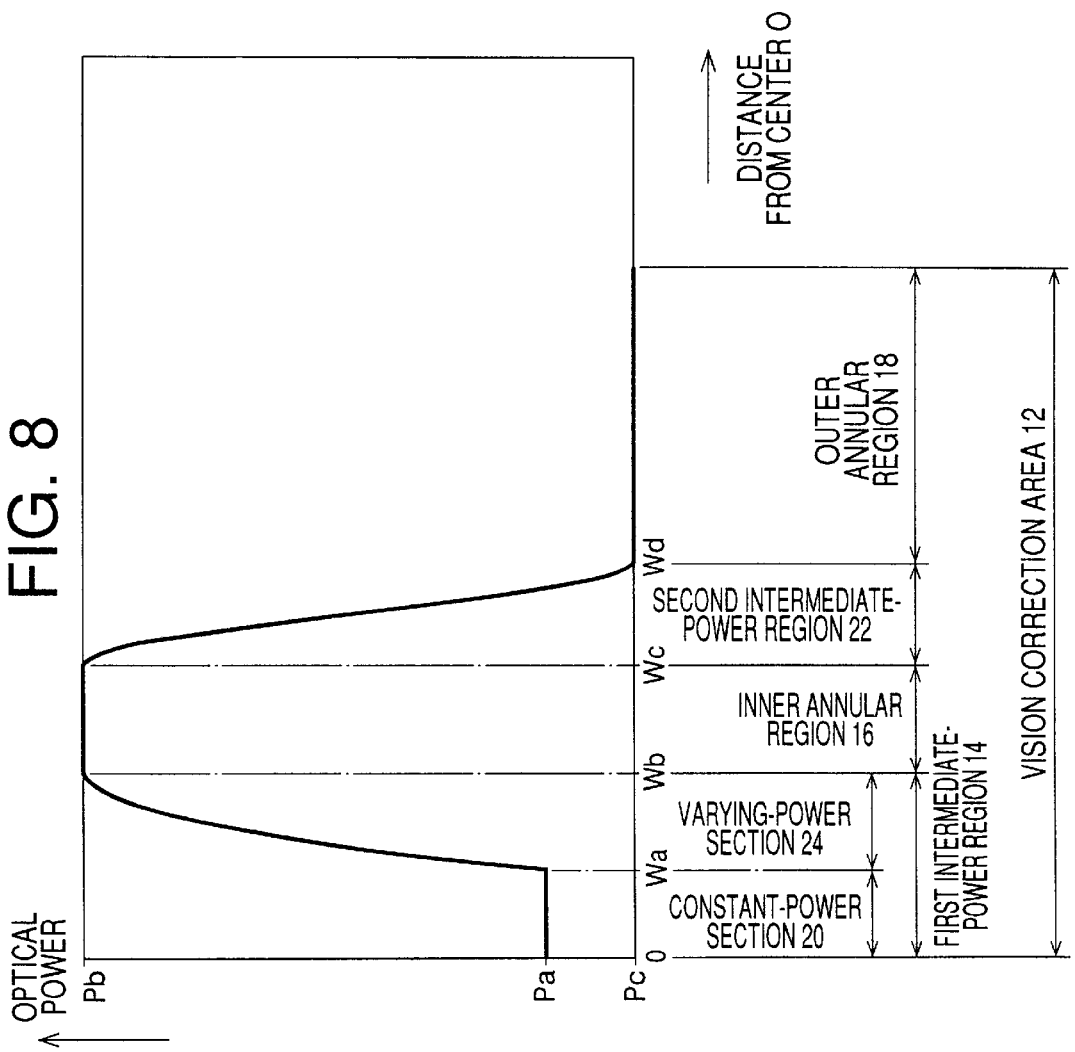

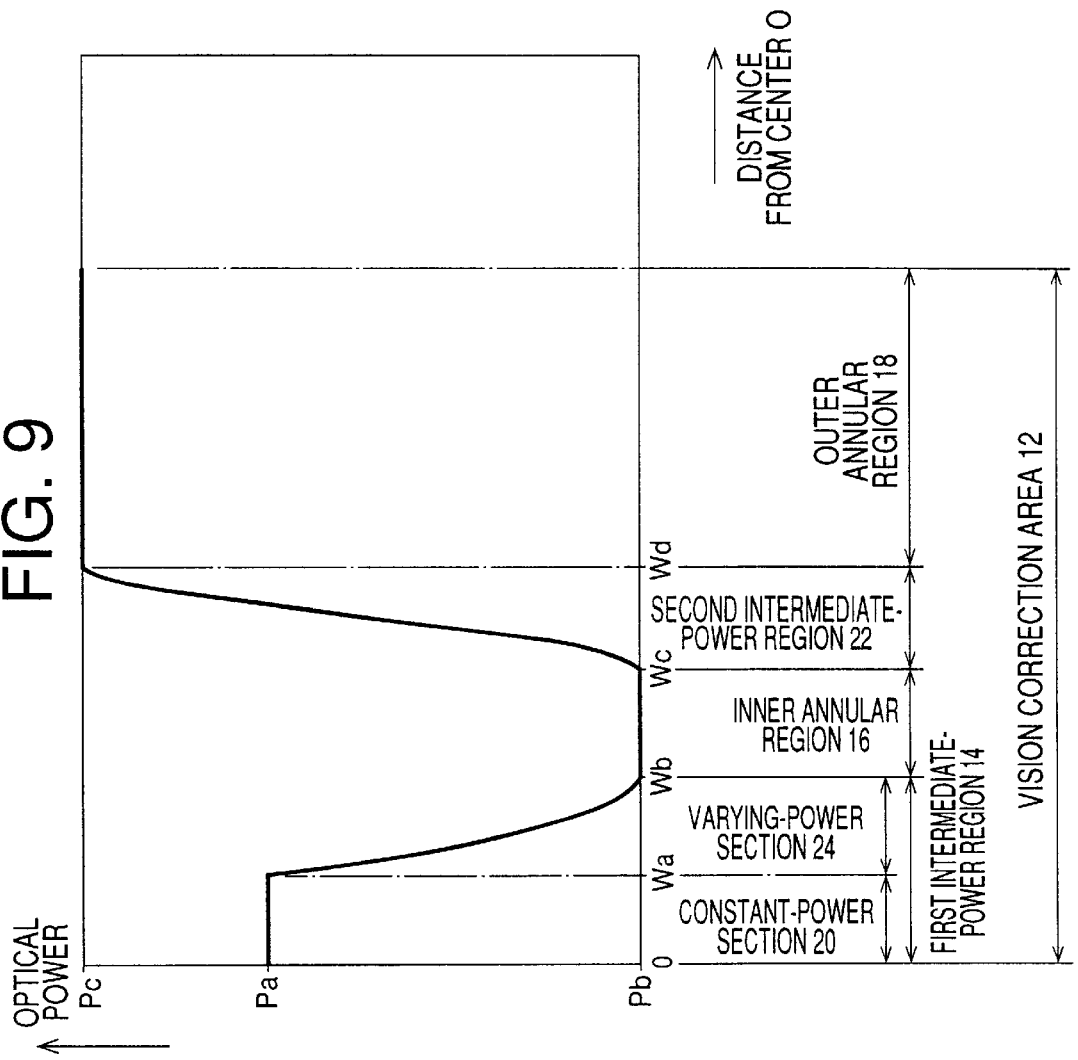

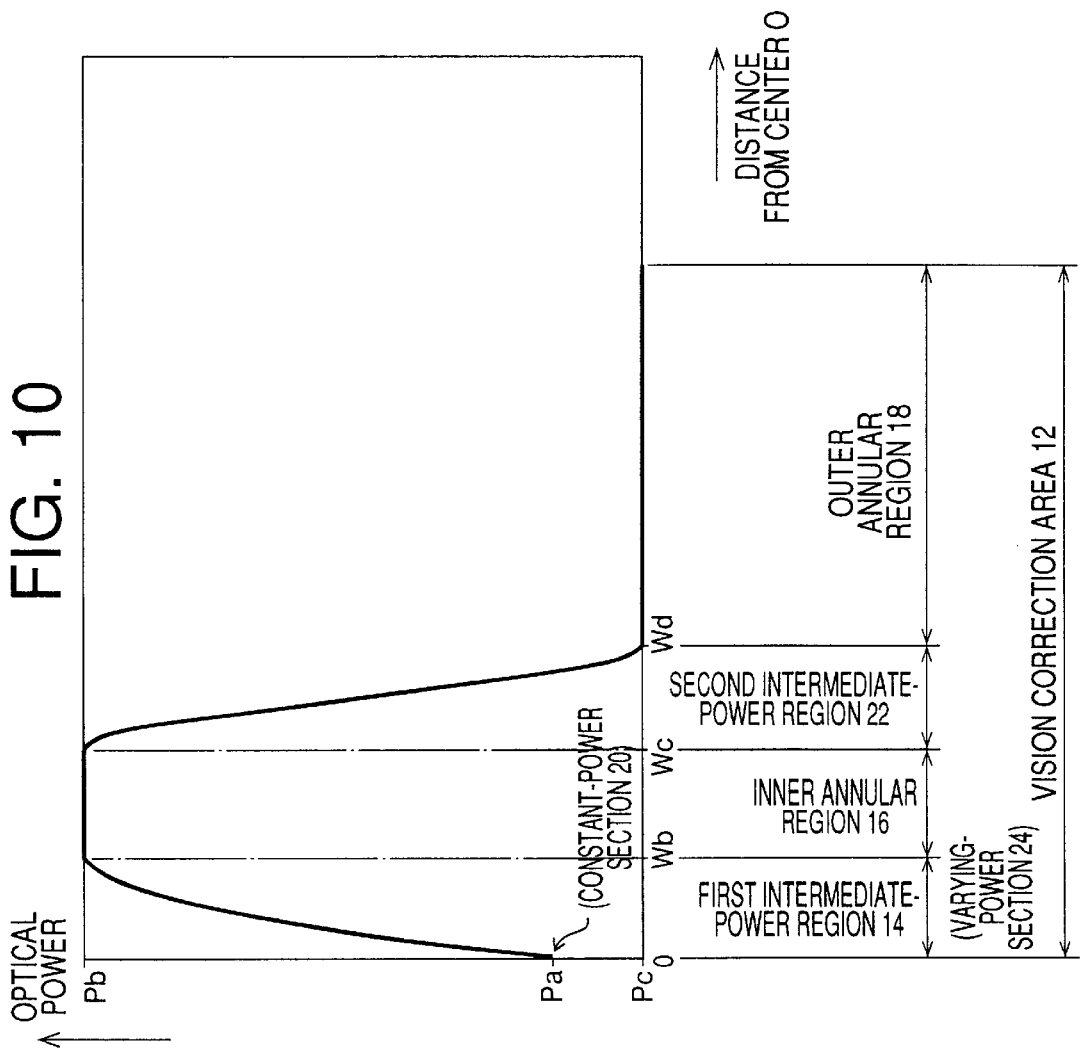

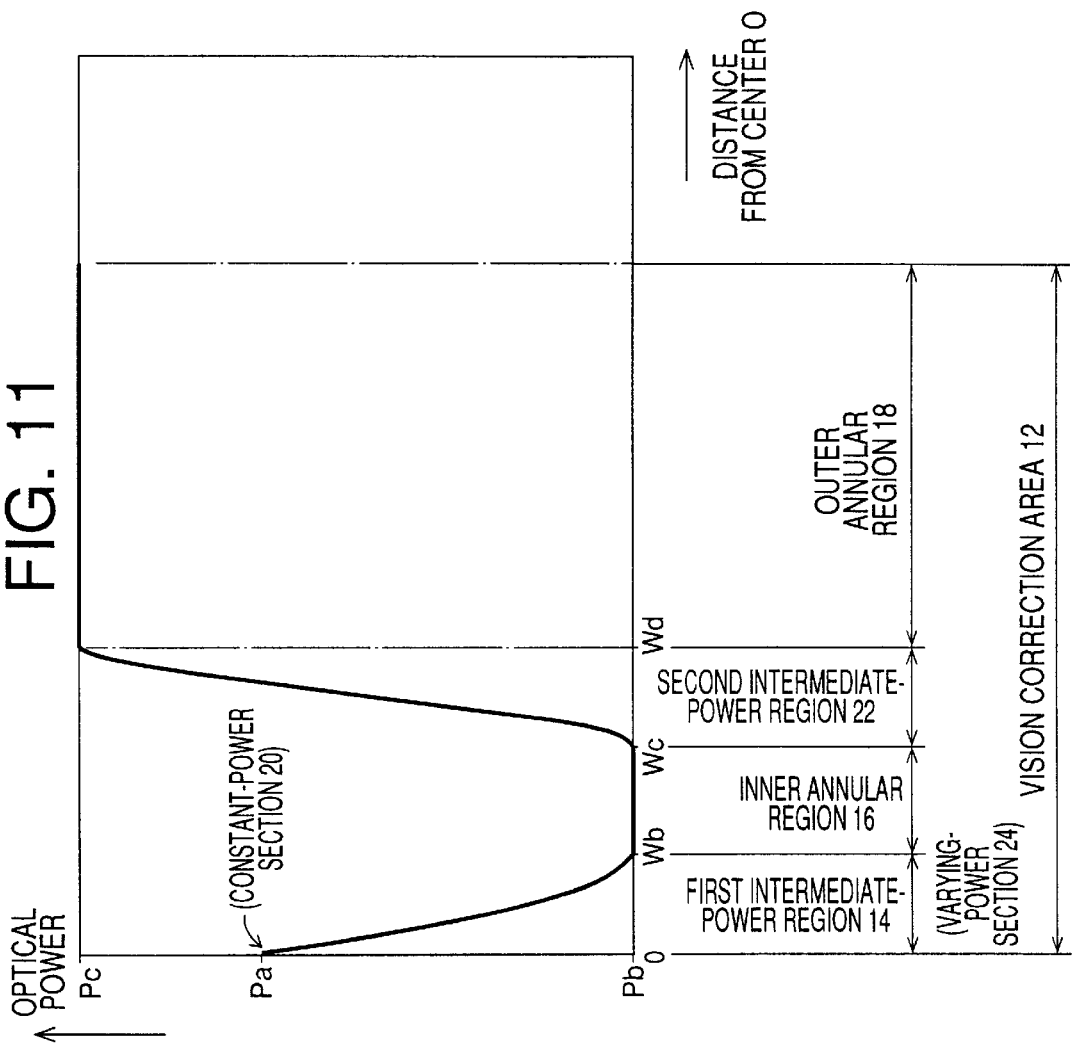

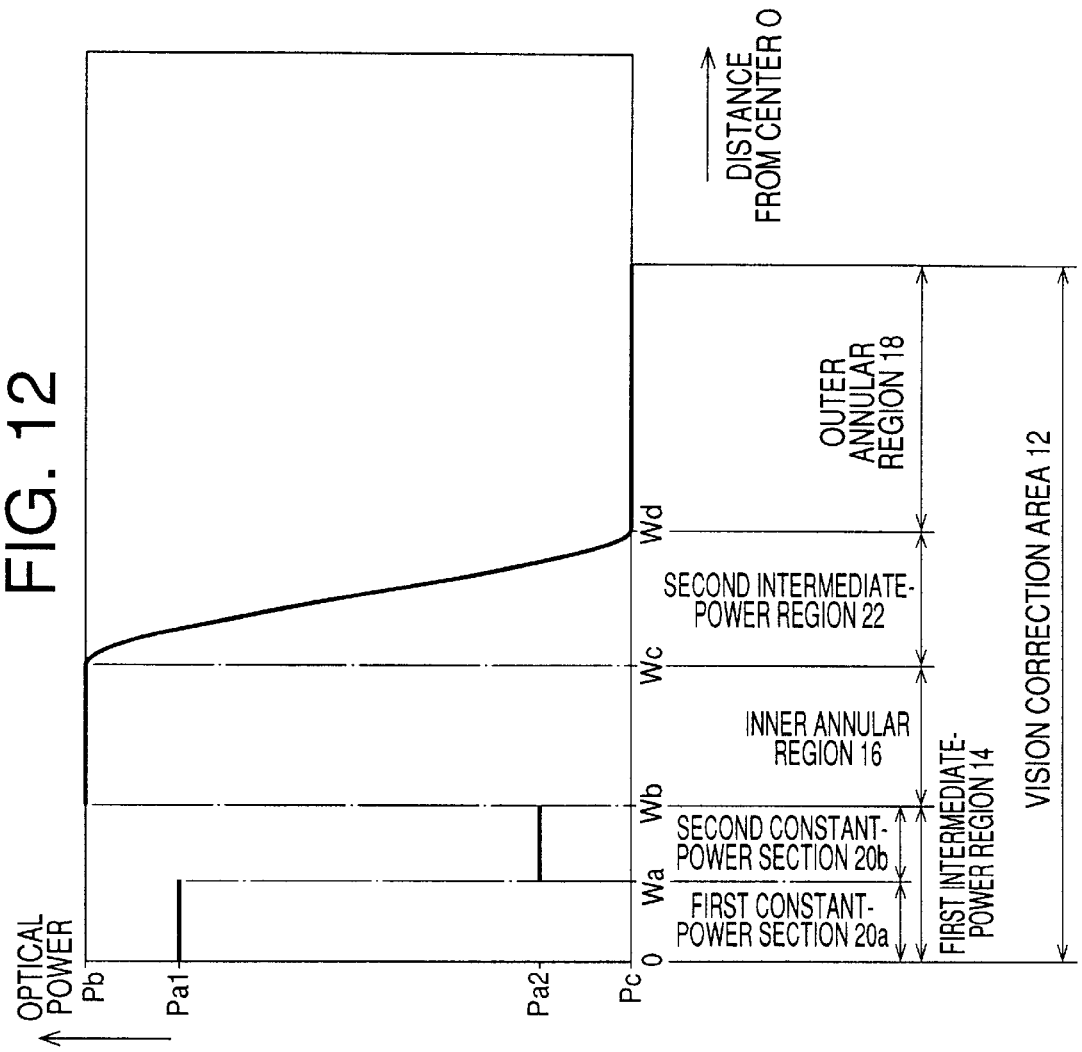

MULTIFOCAL OCULAR LENS HAVING INTERMEDIATE-DISTANCE VISION CORRECTION REGION FORMED IN CENTRAL PART OF VISION CORRECTION AREA

The present application is based on Japanese Patent Application No. 10-294999 filed Oct. 16, 1998, the content of which is incorporated hereinto by reference.

BACKGROUND OF THE INVENTION

1. Field of the Invention

The present invention relates in general to an ocular lens such as a contact lens placed on an eyeball or an intraocular lens inserted within an eye. More particularly, the invention is concerned with a multifocal ocular lens having a plurality of vision correction regions with respective different values of optical or vision correction power.

2. Discussion of the Related Art

As an ocular lens used for vision correction of an eye suffering from deteriorated accommodation such as presbyopia, there has been proposed a multifocal ocular lens having a plurality of vision correction regions which provide respective different values of optical power. As one example of the multifocal ocular lens, JP-A-63-95415 and JP-A-1-319729 disclose an alternating or translating vision type contact lens, wherein the vision correction regions with different values of optical power are selectively and alternatively used as needed in observing objects, with a shift of the visual axis of the lens user or wearer. As another example of the multifocal ocular lens, U.S. Pat. No. 4,580,882 and JP-A-2-217818 disclose a simultaneous vision type contact lens, wherein the vision correction regions are simultaneously used, and one of the vision correction regions through which a desired image is observed is selected by an action of the lens wearer's brain.

In either of the alternating and simultaneous vision type ocular lenses described above, there is proposed: a so-called bifocal ocular lens having two vision correction regions, i.e., a near vision correction region through which near objects are observed and a distant vision correction region through which distant objects are observed; and a multifocal ocular lens having such near and distant vision correction regions and at least one intermediate vision correction region which is interposed between those near and distant vision correction regions and which provides an optical power different from the optical powers of the near and distant vision correction regions. The multifocal ocular lens has at least three vision correction regions having respective different optical power values.

The bifocal ocular lens having the two vision correction regions, i.e., the near and distant vision correction regions, tends to suffer from a jump or overlapping of the image of an object which is located intermediate between near and distant objects. This is because the bifocal ocular lens has only two focal points which correspond to the respective near and distant vision correction regions. Further, the bifocal ocular lens has surface discontinuity at a junction of the near and distant vision correction regions, in other words, the two vision correction regions are not smoothly connected to each other at the junction therebetween, deteriorating a wearing comfort as felt by the lens user.

In the multifocal ocular lens, each of the plurality of vision correction regions inevitably has a relatively small radial dimension, so that the optical power of the lens changes in steps in its radial direction, corresponding to the plurality of vision correction regions. In this case, the near and distant vision correction regions do not have sufficiently large surface areas, whereby the images to be obtained through these near and distant vision correction regions undesirably tend to be blurred. Moreover, since the optical power in the at least one intermediate vision correction region changes in steps, the multifocal ocular lens does not assure a high degree of visual acuity of the object located intermediate between the near and distant objects, so that the multifocal ocular lens is likely to suffer from a problem of ghosting or double imaging.

JP-A-5-181096 discloses a multifocal ocular lens having a near vision correction region, an intermediate vision correction region, and a distant vision correction region, so that the optical power of the multifocal ocular lens continuously changes in its radial direction from the value of one of the near and distant vision correction regions to the value of the other of the near and distant vision correction regions. This multifocal ocular lens was developed in an attempt to improve its wearing comfort as felt by the lens user, and assure clear viewing of the objects located intermediate between the near and distant objects. However, the proposed multifocal ocular lens is still unsatisfactory in providing sufficiently clear viewing of both of the near and distant objects.

JP-A-9-26559 proposes a bifocal ocular lens having a plurality of pairs of the near and distant vision correction regions which are arranged such that the near and distant vision correction regions are alternatively located in the radial direction of the ocular lens. Like the ordinary bifocal ocular lens having one pair of near and distant vision correction regions, the proposed bifocal ocular lens does not assure clear viewing of the object located intermediate between the near and distant objects, and suffers from the jump or overlapping of the image.

SUMMARY OF THE INVENTION

It is therefore an object of the present invention to provide a multifocal ocular lens having a novel structure, which multifocal ocular lens is capable of assuring sufficiently enhanced visual acuity of an object located intermediate between near and distant objects with high stability, while at the same time assuring a high degree of visual acuity of both of the near and distant objects.

The above object of the present invention may be attained according to the principle of the invention which provides a multifocal ocular lens having a vision correction area including at least one distant vision correction region having a first optical power value for distant vision correction and at least one near vision correction region having a second optical power value for near vision correction, wherein the vision correction area further includes a central intermediate-distance vision correction region which has a third optical power value for intermediate vision correction between the first and second optical power values and which is located in a central portion of the vision correction area such that the distant and near vision correction regions are located radially outwardly of the central intermediate-distance vision correction region.

The multifocal ocular lens of the present invention constructed as described above assures a high degree of visual acuity of the objects at desired distances, i.e., at the desired far and near distances, owing to the first and second optical power values (distant and near vision correction power values) given to the distant and near vision correction regions, respectively. Further, the present multifocal ocular lens is capable of assuring a high degree of visual acuity of objects located at an intermediate distance between the far and near distances, owing to the central intermediate-distance vision correction region which has the third or intermediate vision correction optical power value intermediate between the first and second or distant and near vision correction power values. For assuring sufficiently high visual acuity at both of the far and near distances, the distant and near vision correction power values of the distant and near vision correction regions are preferably made constant in the radial direction of the ocular lens. However, the distant and near vision correction power values may be slightly changed in the radial direction for the purpose of reducing aberration.

Since the central intermediate-distance vision correction region is located in the central portion of the vision correction area in the present multifocal ocular lens, the intermediate-distance vision correction region can be advantageously positioned on the pupil of the lens user's eye, irrespective of circumferential positioning stability of the lens, displacement of the lens during its use on the eye, and a change in the diameter of the pupil. Accordingly, the present multifocal ocular lens is capable of assuring a high degree of visual acuity of the object located at the intermediate distance between the near and far distances, with high viewing stability.

In the present multifocal ocular lens, the optical power of the central intermediate-distance vision correction region is determined so as to be held within a range between the two constant optical power values of the distant and near vision correction regions, to thereby assure enhanced visual acuity of the object located at the intermediate distance between the near and far distances.

The principle of the present invention is applicable to various kinds of ocular lenses such as contact lenses and intraocular lenses, particularly to the contact lenses, which can be advantageously used as presbyopia correction contact lenses. Further, the present invention is applicable to both of soft and hard contact lenses.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 7 is a graph showing one example of the optical power distribution of a contact lens according to a further embodiment of the invention;

FIG. 8 is a graph showing an example of the optical distribution of a contact lens according to a still further embodiment of the invention;

FIG. 9 is a graph showing an of the optical power distribution a contact lens according to a yet further embodiment of the invention;

FIG. 10 is a graph showing an example of the optical power distribution of a contact lens according to still another embodiment of the invention;

FIG. 11 is a graph showing an example of the optical power distribution of a contact lens according to yet another embodiment of the present invention; and FIG. 12 is a graph showing an example of the optical power distribution of a contact lens according to a further embodiment of the present invention;

DETAILED DESCRIPTION OF THE PREFERRED EMBODIMENTS

Figure 1:
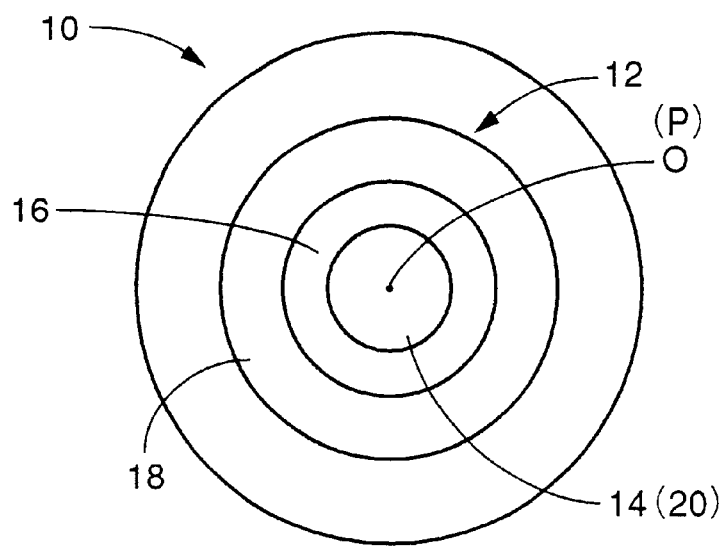
FIG. 1 is a plan view of a contact lens according to one embodiment of the present invention.

Referring first to FIG. 1, there is shown a multifocal ocular lens in the form of a contact lens 10 constructed according to one embodiment of the present invention. This contact lens 10 includes, at its central portion, a vision correction area 12 providing a vision correction power for correcting the vision of the lens user. In the contact lens 10 of FIG. 1, the vision correction area 12 has an optical center axis P which is aligned with a geometric center axis O of the lens, which is a center of a circle defined by the periphery of the lens. The optical center axis P may be suitably offset from the geometric center O of the lens, depending upon the position of the pupil and the shape of the cornea of the lens user, as shown in FIG. 2 by way of example.

In view of general tendencies regarding the configuration and curvature of the cornea and the position of the pupil, it is preferable that the optical center axis P of the vision correction area 12 be offset from the geometric center O of the lens by a distance of not larger than 2.0 mm, toward a side portion of the contact lens 10, which side portion is to be located on the side of the nose of the lens user when the contact lens is worn on the user's eye. When the contact lens whose optical center axis P is offset from its geometric center axis O as described above is worn on the lens user's eye, the optical center axis P is easily aligned with the center of the pupil, so that the contact lens effectively achieves an enhanced vision correction performance. The optical center axis P of the vision correction area 12 of the contact lens 10 may also be offset from the geometric center axis O of the contact lens in the downward direction as shown in FIG. 2 or in the upward direction, depending upon the living environment or lifestyle of the lens user. When the contact lens whose optical center axis P is offset from its geometric center axis O in this manner is worn on the lens user's eye, the optical center axis P can be easily aligned with the center of the pupil.

An annular area located radially outwardly of the vision correction area 12, in other words, the radially outermost portion of the contact lens 10 is not to be located on the pupil of the lens user's eye when the contact lens 10 is worn on the eye. Accordingly, this radially outermost portion does not have any optical vision correction effect, but is provided for easy and stable fitting and positioning of the lens on the eye. This radially outermost portion is subjected to a slab-off machining as needed. Especially when the optical center axis P is offset from the geometric center O of the lens as described above depending upon the position of the pupil of the lens user's eye, the contact lens is provided with a suitable rotation preventive mechanism for preventing rotational displacement of the lens in its circumferential direction during its use on the eye. As this rotation preventive mechanism, a prism ballast mechanism is preferably employed. The contact lens which employs the prism ballast mechanism has a gravity center at a relatively lower portion thereof, by increasing the thickness of the lower portion, whereby the contact lens can be placed on the eye while maintaining the desired circumferential orientation. Since the prism ballast mechanism is known in the art, a detailed description thereof is dispensed with.

Figure 2:
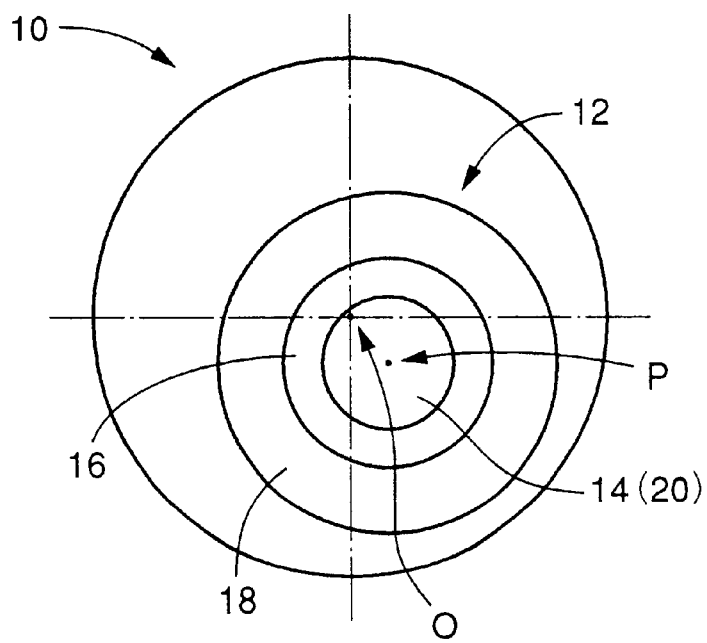
FIG. 2 is a plan view of a contact lens according to another embodiment of the present invention.

As shown in FIGS. 1 and 2, the vision correction area 12 of the contact lens 10 includes a circular intermediate-distance vision correction region 14, a radially inner annular vision correction region 16, and a radially outer annular vision correction region 18, which vision correction regions 14, 16, 18 provide respective different values of optical power, which are suitably determined. For providing a simultaneous vision type multifocal contact lens, it is preferable that the intermediate-distance vision correction region 14, and the inner and outer annular vision correction regions 16, 18 have their centers on a common optical center axis, i.e., on the optical center axis P of the vision correction area 12. Preferably, the optical center axis P of the vision correction area 12 is aligned with the geometric center O.

In the contact lenses shown in FIGS. 1 and 2, the circular intermediate-distance vision correction region 14 has a center located on the optical center axis P, while the radially inner and outer annular vision correction regions 16, 18 are located radially outwardly of and concentrically with the circular vision correction region 14. These vision correction regions 14, 16, 18 are continuously connected and formed adjacent to one another in the radial direction of the contact lens 10, to thereby provide the vision correction area 12. It is noted that the vision correction regions 14, 16, 18 have a truly circular or annular shape. The vision correction region 14 and the vision correction regions 16, 18 may be formed to have an elliptical shape and an elliptically annular shape.

The radially inner and outer vision correction regions 16, 18 having respective different values of optical power function as one and the other of a near vision correction region and a distant vision correction region. The near vision correction region provides a constant vision correction power for correcting the user's near vision over a selected portion or preferably an entire portion of its radial width or dimension. On the other hand, the distant vision correction region provides a constant vision correction power for correcting the user's distant vision over a selected portion or preferably an entire portion of its radial width or dimension. Depending upon the user's visual requirements and lifestyle or living environment, for example, the inner and outer annular vision correction regions 16, 18 are used as one and the other of the near and distant vision correction regions, respectively.

Figure 3:
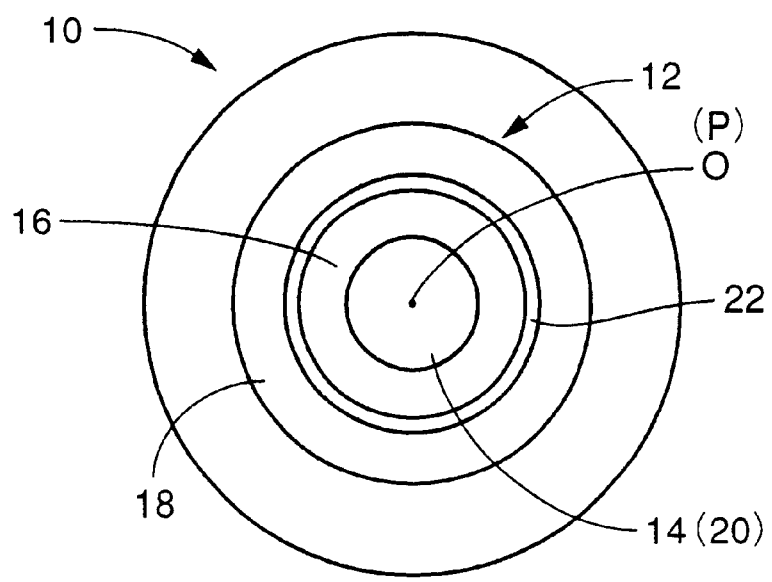
FIG. 3 is a plan view of a contact lens according to still another embodiment of the present invention.

When the annular correction regions 16, 18 are located radially outwardly of and concentrically with the central intermediate-distance vision correction region 14, the two regions 16, 18 which are formed adjacent to each other in the embodiment of FIGS. 1 and 2 may be preferably spaced from each other in the radial direction by an annular second intermediate-distance vision correction region 22 interposed therebetween, as shown in FIG. 3, in view of a large difference between the optical power values of the inner and outer annular vision correction regions 16, 18. This annular second intermediate-distance vision correction region 22, which has a suitable radial width, preferably provides an optical power which is intermediate between the optical power values of the annular near and distant vision correction regions 16, 18, so that the contact lens is less likely to suffer from a problem of ghosting or double imaging.

In the contact lenses 10 of FIGS. 1–3, the central circular first intermediate-distance vision correction region 14 provides, over its entire area, a constant optical power between the optical power values of the annular near and distant vision correction regions 16, 18. According to this arrangement, the first intermediate-distance vision correction region 14 provides the optical power for correcting the user's vision for viewing an object at a distance intermediate between the two distances to which the optical power values of the annular near and distant vision correction regions 16, 18 are tuned respectively. Accordingly, the present contact lenses 10 of FIGS. 1–3 permit the user to have a clear viewing of the object at the intermediate distance, based on the optical power value of the first intermediate-distance vision correction region 14.

It is preferable that the inner surface (i.e., the spherical concave surface) of the contact lens 10 be formed as a base curved surface having a profile following that of the cornea of the lens user's eye. In general, the vision correction regions 14, 16, 18 of the contact lens 10 are given the respective different optical power values, by adjusting the configuration of its outer surface (i.e., the spherical convex surface). Alternatively, the optical power values of the vision correction regions 14, 16, 18 can be tuned to the respective desired values, by adjusting the configurations of both of its inner and outer surfaces, or by adjusting the configuration of the inner surface only.

The opposite inner and outer surfaces of the contact lens generally have spherical configurations (spherical portions) corresponding to the inner and outer annular vision correction regions 16, 18, so that the optical power values of these two regions 16, 18 are constant over their entire areas. When it is required to correct the vision of the eye suffering from astigmatism, either one of the inner and outer surfaces of the contact lens has a toric portion corresponding to the vision correction area 12. In this case, the contact lens has different values of optical power in different diametric directions.

In the present contact lens 10 including the central intermediate-distance vision correction region 14, and the inner and outer annular vision correction regions 16, 18, the optical power values of these regions 14, 16, 18 are suitably determined depending upon the user's visual requirements and lifestyle or living environment. Some examples of determining the optical power values of the vision correction regions 14, 16, 18 of the contact lens 10 having the second intermediate-distance vision correction region 22 will be described referring to graphs showing a distribution of the optical power of the lens in its radial direction.

Figure 4:
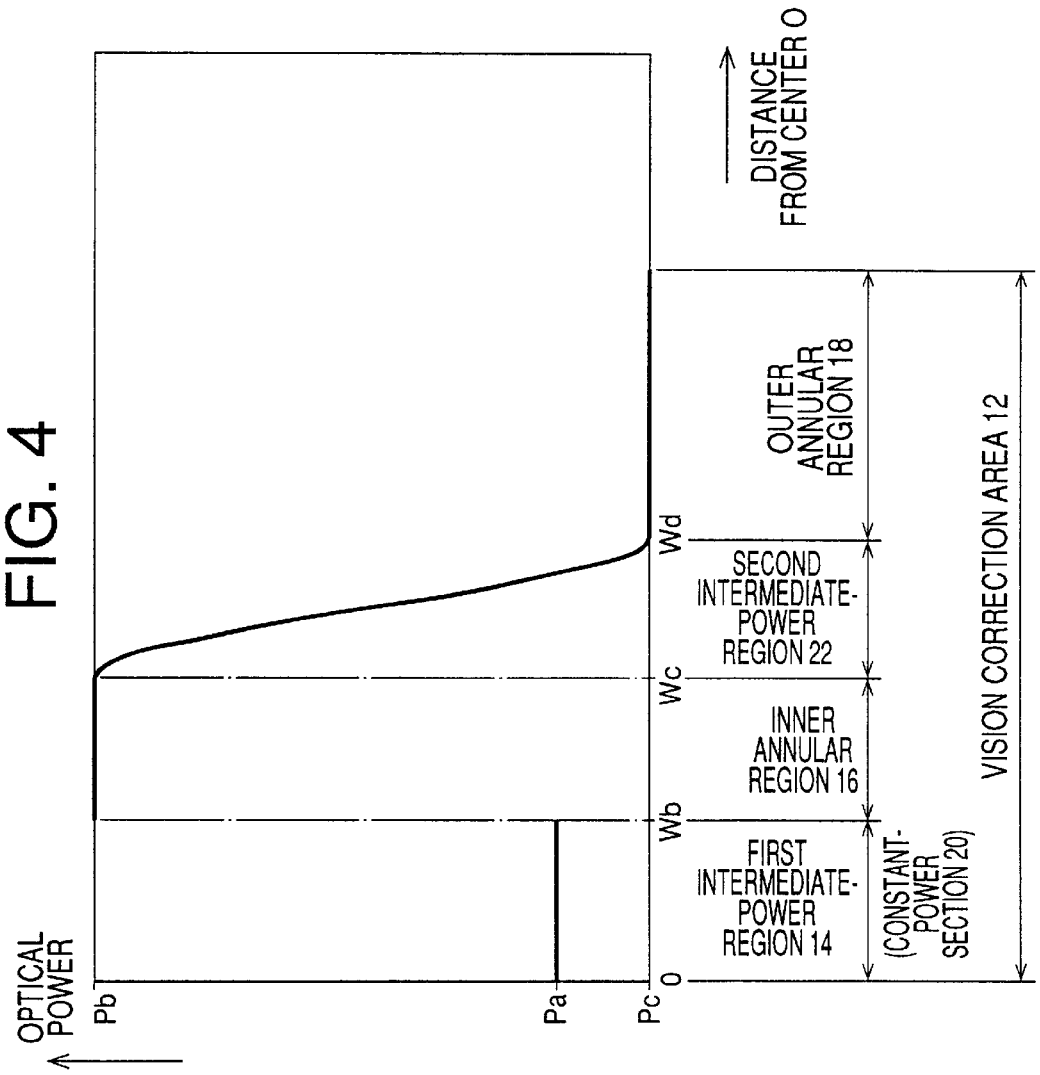
FIG. 4 is a graph showing one example of a distribution of the optical power of the contact lens of FIG. 3 in the radial direction.
Figure 5:
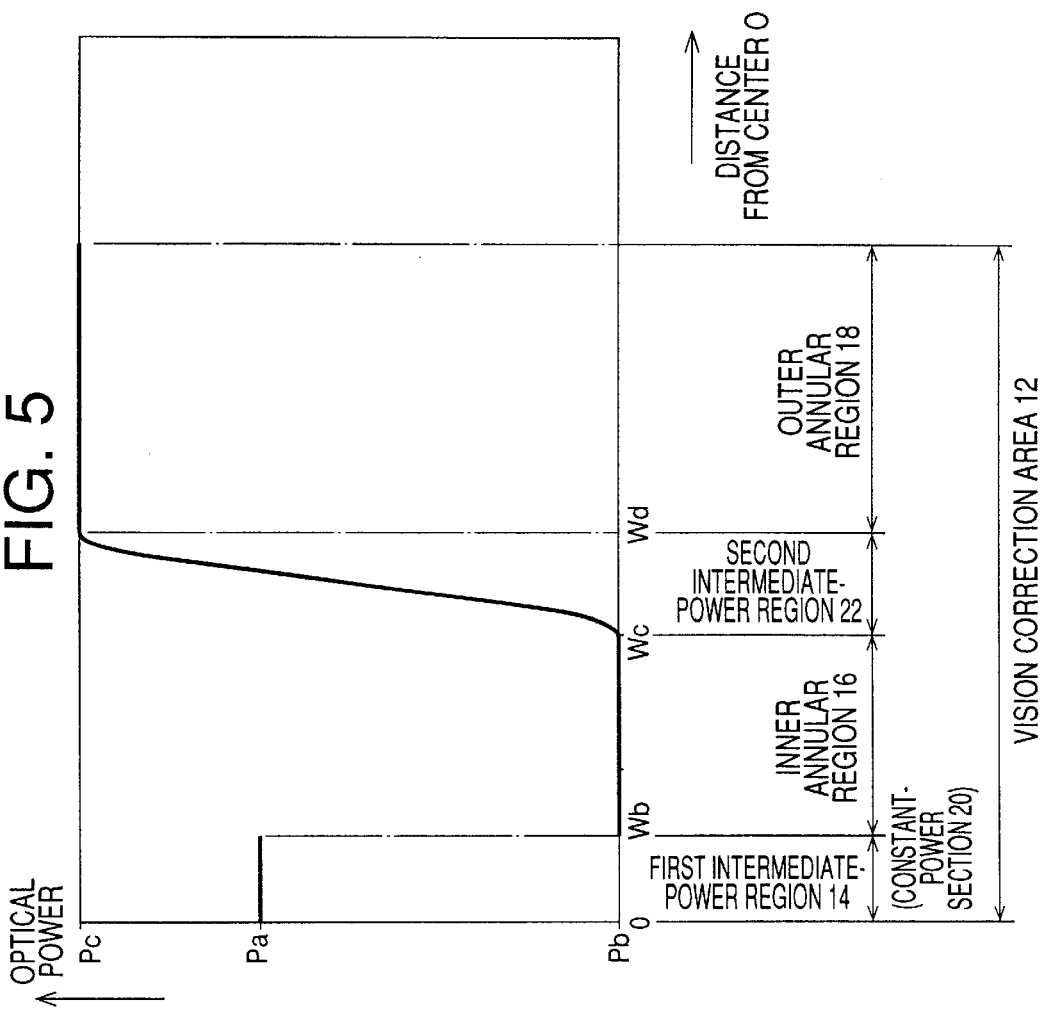
FIG. 5 is a graph showing another example of the optical power distribution of the contact lens of FIG. 3 in the radial direction.

In the contact lenses whose optical power distributions are indicated by the graphs of FIGS. 4 and 5, respectively, the central circular first intermediate-distance vision correction region 14 is a constant-power section 20 whose optical power value Pa is constant over its entire radial dimension, while the annular second intermediate-distance vision correction region 22 is a varying-power section whose optical power continuously varies from an optical power value of the inner annular vision correction region 16 toward an optical power value of the outer annular vision correction region 18.

Described more specifically, the contact lens whose optical power distribution is indicated by the graph of FIG. 4 has the radially outer distant vision correction region 18 having a constant optical power value Pc for correcting the user's distant vision, and the radially inner near vision correction region 16 having a constant optical power value Pb for correcting the user's near vision. The optical power value Pb of the near vision correction region 16 is represented as a sum of the distant vision correcting optical power value Pc and an additional value ADD, i.e., Pb=Pc+ADD. On the other hand, the contact lens whose optical power distribution is indicated by the graph of FIG. 5 has the radially inner distant vision correction region 16 having a constant optical power value Pb for correcting the user's distant vision, and the radially outer near vision correction region 18 having a constant optical value Pc for correcting the user's near vision. The optical power value Pc of the radially outer near vision correction region 18 is represented as a sum of the distant vision correcting optical power value Pb and an additional power ADD, i.e., Pc=Pb+ADD.

In the contact lenses 10 of FIGS. 1–3 wherein the central circular first intermediate-distance vision correction region 14 consists of the single constant-power section 20, the optical power value Pa of this constant-power section 20 is preferably made closer to the optical power value Pc of the outer annular vision correction region 18, than to the optical power value Pb of the inner annular vision correction region 16, as shown in the graphs of FIGS. 4 and 5. This arrangement is effective to assure significantly enhanced viewing or imaging of the object at the intermediate distance. Owing to the vision correction effect exhibited by the first intermediate-distance vision correction region 14 consisting of the constant-power section 20 whose optical power value Pa is closer to the optical power value Pc, the visual acuity of the near or distant object which is to be provided by the outer vision correction region 18 can be effectively maintained or compensated for, even where the optical center axis P of the vision correction area 12 is not located on the center of the pupil due to an error in the position of the optical center axis P or a displacement of the lens during its use on the eye, which results in a decrease in the effective area of the outer vision correction region 18 for correcting the user's near or distant vision.

When the outer annular vision correction region 18 functions as the distant vision correction region having the distant vision correction power Pc (diopter: abbreviated as "Dptr.") and the inner annular vision correction region 16 functions as the near vision correction region having the near vision correction power Pb=Pc+ADD (Dptr.), as shown in the graph of FIG. 4, in particular, the optical power Pa (Dptr.) of the single constant-power section 20 formed in the central first intermediate-distance vision correction region 14 is preferably determined so as to satisfy the following formula:

$$Pc+0.25 \leq Pa \leq Pc+ADD/2$$

When the optical power Pa of the constant-power section 20 is determined as described above, the contact lens achieves a considerably high degree of visual acuity of the object at an intermediate distance, based on the vision correction performance to be exhibited by the first intermediate-distance vision correction region 14. In addition, since the outer distant vision correction region 18 and the first intermediate-distance vision correction region 14 (the constant-power section 20) respectively provide the distant vision correction power Pc and the vision correction power Pa close to the distant vision correction power Pc, the inner near vision correction region 16 is capable of receiving an amount of light sufficient for near viewing, owing to the optical characteristics of the first intermediate-distance vision correction region 14 and the outer distant vision correction region 18.

In either of the contact lenses whose optical power distributions are indicated in the respective graphs of FIGS. 4 and 5, the optical power of the annular second intermediate-distance vision correction region 22 continuously varies in the radial direction of the lens. This second intermediate-distance vision correction region 22 eliminates discontinuity of the optical power at the boundary between the inner and outer near and distant vision correction regions 16, 18. The second intermediate-distance vision correction region 22 may have a radial distribution of optical power represented by a linear equation or expression, such that the optical power of the second intermediate-distance vision correction region 22 linearly varies between the optical powers Pb, Pc of the near and distant vision correction regions 16, 18. However, it is preferable that the second intermediate-distance vision correction region 22 have a radial distribution of optical power value which is represented by one polynomial equation of second or higher degree or order. In the contact lens 10 of FIG. 3 whose vision correction area 12 consists of the central circular first intermediate-distance vision correction region 14, the inner and outer annular near and distant vision correction regions 16, 18, and the annular second intermediate-distance vision correction region 22, which vision correction regions 14, 16, 18, and 22 have a common optical center axis, it is more preferable that the optical power y of the second intermediate-distance vision correction region 22 at a radial distance x from the optical center axis P of the vision correction area 12 be determined as described below, by reference to some formulas wherein Pb, Pc, Wc and Wd respectively represent the optical power of the radially inner vision correction region 16, the optical power of the radially outer vision correction region 18, a radial distance from the optical center axis P to a boundary between the inner vision correction region 16 and the second intermediate-distance vision correction region 22, and a radial distance from the optical center axis P to a boundary between the second intermediate-distance vision correction region 22 and the outer vision correction region 18.

Namely, the distribution of the optical power (y, Pb, Pc) in the radial direction may be represented by a line in a coordinate system wherein the optical power is taken along the ordinate (y axis) while the radial distance (x) or position (Wb, Wd) is taken along the abscissa (x axis). The optical power values Pb, Pc of the vision correction regions 16, 18 are represented by respective two straight lines parallel to the abscissa or x axis. The line representing the optical power y of the second intermediate-distance vision correction region 22 is tangent at its opposite ends to the above-indicated two straight lines at respective two coordinate points (Wc, Pb) and (Wd, Pc), as indicated in FIGS. 4 and 5. In this case, therefore, a derivative y' of the optical power y of the second intermediate-distance vision correction region 22 is represented by the following equation:

$$y'=(x-Wc)(x-Wd)$$

Therefore, the optical power y is represented by the following equation including coefficients E2 and F2:

$$y=E2(x^3/3-x^2(Wc+Wd)/2+x \cdot Wc \cdot Wd)+F2$$

When the values Wc and Pb are substituted for the values x and y in the above equation, respectively, the following equation (1) is obtained. When the values Wd and Pc are substituted for the values x and y in the above equation, respectively, the following equation (2) is obtained.

$$Pb=E2(Wc^3/3-Wc^2(Wc+Wd)/2+Wc \cdot Wc \cdot Wd)+F2 \quad (1)$$

$$Pc=E2(Wd^3/3-Wd^2(Wc+Wd)/2+Wd \cdot Wc \cdot Wd)+F2 \quad (2)$$

On the basis of the above equations (1) and (2), the coefficients E2 and F2 are obtained as follows:

$$E2=(Pb-Pc)/((Wc^3-Wd^3)/3-(Wc^2-Wd^2)(Wc+Wd)/2+(Wc-Wd)Wc \cdot Wd)$$

$$F2=Pb-E2(Wc^3/3-Wc^2(Wc+Wd)/2+Wc \cdot Wc \cdot Wd)$$

For permitting the second intermediate-distance vision correction region 22 to exhibit an improved vision correction effect, this vision correction region 22 preferably has a radial width of 0.1–2.0 mm between the outer and inner peripheries of the inner and outer annular vision correction regions 16, 18.

Figure 6:
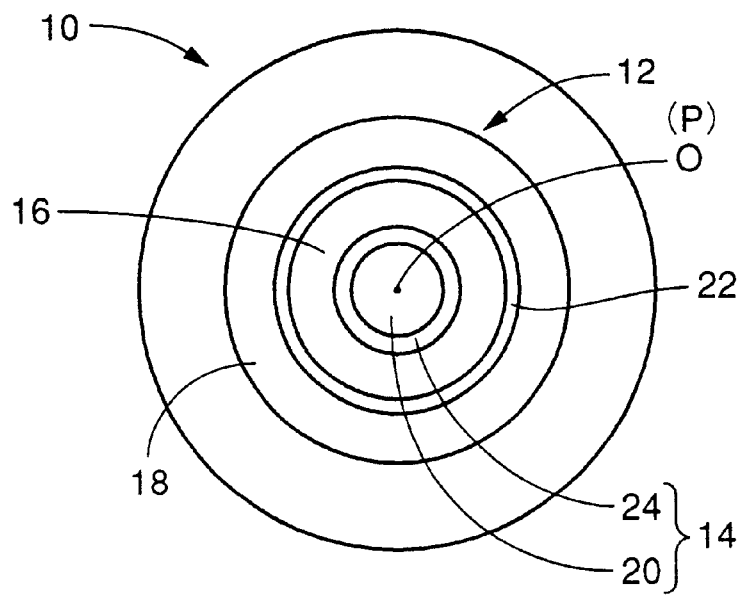
FIG. 6 is a plan view of a contact lens according to a further embodiment of the present invention.

In the contact lens 10 of FIG. 3 whose optical power distribution is shown in the graphs of FIGS. 4 and 5, by way of example, the first intermediate-distance vision correction region 14 has the optical power value Pa which is constant over its entire area, so that the entire area of the central circular region 14 functions as the constant-power section 20. However, the first intermediate-distance vision correction region 14 may include a transition section or varying-power section 24 formed at its radially outer portion with a suitable radial width, as shown in FIG. 6. In this case, the constant-power section 20 is formed at a central portion of the first intermediate-distance vision correction region 14 and located radially inwardly of the varying-power section 24. This varying-power section 24 provides an optical power which continuously varies in the radial direction of the lens 10 from the optical power value of the constant-power section 20 to the optical power value of the radially inner annular vision correction region 16. The contact lens 10 which includes the thus formed varying-power section 24 assures a high degree of visual acuity of the objects in a relatively wide range of the intermediate distance between the near and far distances to which the radially inner and outer vision correction regions 16, 18 are tuned. Further, this arrangement is effective to reduce the ghosting or double imaging problem.

Preferably, the varying-power section 24 of the first intermediate-distance vision correction region 14 is interposed between the constant-power section 20 and the radially inner vision correction region 16, with a radial width of 0.1–2.0 mm. If the radial width of the varying-power section 24 is too small, this section 24 does not exhibit the intended effect described above. On the other hand, if the radial width of the varying-power section 24 is too large, the sizes of the constant-power section 20 and the radially inner and outer vision correction regions 16, 18 tend to be insufficient.

The varying-power section 24 of the first intermediate-distance vision correction region 14 may have a radial distribution of optical power represented by a linear equation, so that the varying-power section 24 has the optical power which linearly varies between the optical power value Pa of the constant-power section 20 and the optical power value Pb of the inner annular vision correction region 16. However, it is preferable that the varying-power section 24 have a radial distribution of optical power represented by one polynomial equation of second or higher degree or order, to thereby assure a high degree of freedom in tuning the optical power values of the vision correction regions 14, 16, 18 to permit clear viewing or imaging of the near, far and intermediate objects. In the contact lens 10 of FIG. 6, the first intermediate-distance vision correction area 14 and the radially inner vision correction region 16 have a common optical center axis at the optical center axis P of the vision correction area 12, and the first intermediate-distance vision correction region 14 consists of the constant-power section 20 whose center is located on its optical center, and the varying-power section 24 formed radially outwardly of the constant-power section 20. In this arrangement, it is more preferable that the optical power y of the varying-power section 24 of the first intermediate-distance vision correction region 14 at the radial distance x from the optical center axis P of the vision correction area 12 be determined as described below, by reference to some formulas wherein Pa, Pb, Wa and Wb respectively represent the optical power of the constant-power section 20, the optical power of the radially inner vision correction region 16, a radial distance from the optical center axis P to a boundary between the constant-power section 20 and the varying-power section 24, and a radial distance from the optical center axis P to a boundary between the first intermediate-distance vision correction region 14 and the radially inner vision correction region 16. For permitting the varying-power section 24 to exhibit the intended effect, the above-indicated radial distances Wa and Wb are determined to satisfy the formula $$0 \leq Wa < Wb.$$

As described above, the distribution of the optical power (y, Pa, Pb) in the radial direction may be represented by a line in the coordinate system wherein the optical power is taken along the ordinate (y axis) while the radial distance (x) or position (Wa, Wb) is taken along the abscissa (x axis). The optical power values Pa, Pb of the constant-power section 20 and the inner annular vision correction region 16 are represented by respective two straight lines parallel to the abscissa or x axis. The line representing the optical power y of the varying-power section 24 is tangent at its opposite ends to the above-indicated two straight lines at respective two coordinate points (Wa, Pa) and (Wb, Pb). In this case, therefore, a derivative y' of the optical power y of the varying-power section 24 is represented by the following equation:

$$y'=(x-Wa)(x-Wb)$$

Therefore, the optical power y is represented by the following equation including coefficients E1 and F1:

$$y=E1(x^3/3-x^2(Wa+Wb)/2+x \cdot Wa \cdot Wb)+F1$$

When the values Wa and Pa are substituted for the values x and y in the above equation, respectively, the following equation (3) is obtained. When the values Wb and Pb are substituted for the values x and y in the above equation, respectively, the following equation (4) is obtained.

$$Pa=E1(Wa^3/3-Wa^2(Wa+Wb)/2+Wa \cdot Wa \cdot Wb)+F1 \quad (3)$$

$$Pb=E1(Wb^3/3-Wb^2(Wa+Wb)/2+Wb \cdot Wa \cdot Wb)+F1 \quad (4)$$

On the basis of the above equations (3) and (4), the coefficients E1 and F1 are obtained as described below.

$$E1=(Pa-Pb)/((Wa^3-Wb^3)/3-(Wa^2-Wb^2)(Wa+Wb)/2+(Wa-Wb)Wa \cdot Wb)$$

$$F1=Pa-E1(Wa^3/3-Wa^2(Wa+Wb)/2+Wa \cdot Wa \cdot Wb)$$

The optical power y of the varying-power section 24 can be determined so as to be represented by an expression of the fourth order, rather than the above-described expression of the third order. In the contact lens whose optical power distribution is indicated by the graph of FIG. 7, for instance, a rate of change A of the optical power in the varying-power section 24 is represented by the following equation:

$$A=(Pb-Pa)/(Wb-Wa)^4$$

Accordingly, the optical power y of the varying-power section 24 at a radial distance x from the optical center axis P is represented by the following equation:

$$y=(Pb-Pa)(x-Wa)^4/(Wb-Wa)^4+Pa$$

In the contact lenses whose optical power distributions are indicated by the respective graphs of FIGS. 8 and 9, a rate of change A of the optical power in the varying-power section 24 is represented by the following equation:

$$A=(Pa-Pb)/(Wb-Wa)^4$$

Accordingly, the optical power y of the varying-power section 24 at the radial distance x from the optical center axis P is represented by the following equation:

$$y=(Pa-Pb)(x-Wb)^4/(Wb-Wa)^4+Pb$$

In the optical power distribution of the varying-power section 24 as described above, it is possible that the rate of change of the optical power y of the varying-power section 24 changes abruptly to zero at a junction between the section 24 and either one of the constant-power section 20 and the inner vision correction region 16, but smoothly to zero at a junction between the section 24 and the other of the constant-power section 20 and the inner vision correction region 16. These different rates of change of the optical power y in the radially inner and outer end portions of the varying-power section 24 are represented by a straight line and a curved line. The different rates of change of the optical power y in the radially inner and outer end portions of the varying-power section 20 assure a high degree of freedom in designing the contact lens regarding light-receiving capability and/or visual acuity in the constant-power section 20 or the inner vision correction region 16.

For improving the effect of the varying-power section 24, this section 24 interposed between the constant-power section 20 and the inner vision correction region 16 desirably has a radial width or radius of 0.1–3.0 mm, preferably 0.5–2.0 mm. If the radial width of the varying-power section 24 is too small, the section 24 does not exhibit the intended effect. On the other hand, if the radial width of the varying-power section 24 is too large, the sizes of the constant-power section 20 and the radially inner and outer vision correction regions 16, 18 tend to be insufficient.

In the embodiments shown in FIGS. 7–9, the central first intermediate-distance vision correction region 14 includes the constant-power section 20 which has a radial width or radius Wa and the constant optical power value Pa which is between the optical power values Pb and Pc of the inner and outer annular near and distant vision correction regions 16, 18. However, the first intermediate-distance vision correction region 14 need not include the constant-power section 20, and may consist of only the varying-power section 24 whose optical power continuously varies from a first extreme value Pa at the optical center axis P to a second extreme value Pb of the inner vision correction region 16, as shown in the graphs of FIGS. 10 and 11. In this case, the contact lens assures clear viewing of the objects in a relatively wide range of the intermediate distance between the near and far distances.

The contact lens of FIG. 11 wherein the first intermediate-distance vision correction region 14 consists of only the varying-power section 24 may be modified such that the first extreme optical power value Pa at the optical center axis P of the vision correction area 12 is equal to the constant optical power value Pc of the outer annular vision correction region 18. In this case, the contact lens assures clear viewing of the objects over the entire range of the intermediate distance between the near and far distances.

It is noted that the first extreme value Pa in FIG. 7 is the minimal value, and the second extreme value Pb in FIG. 8 is the maximal value, while the second extreme value Pb in FIG. 9 is the minimal value. In the embodiment of FIG. 10, the first extreme optical power value Pa is the smallest value at the optical center axis P, while the second extreme optical power value Pb is the largest value at which the continuous increase of the optical value of the varying-power section 24 is terminated. In the embodiment of FIG. 11, the first extreme optical power value Pa is the largest value at the optical center axis P, while the second extreme optical power value Pb is the smallest value at which the continuous decrease of the optical value of the varying-power section 24 is terminated.

Thus, the optical power distribution in a certain portion of the intermediate-distance vision correction region 14 may be represented by a functional equation including the radial distance as a variable. In a differentiable range of the radial position, the maximal and minimal points are points at which the differential coefficient is zero. In a range of the radial position wherein a differential coefficient is not present, the extreme value is a point to which the optical value increases or decreases.

As indicated above, the first intermediate-distance vision correction region 14 consists of the radially inner constant-power section 20 and the radially outer varying-power section 24 as shown in FIGS. 6–9, or alternatively consists of only the varying-power section 24 as shown in FIGS. 10 and 11. In other words, the radius of the constant-power section 20 is preferably selected within a range of 0–3.0 mm. As indicated above, the constant-power section 20 whose radius is larger than 3.0 mm tends to reduce the sizes of the near and distant vision correction regions 16, 18.

While the present invention has been described in detail in its presently preferred embodiments, it is to be understood that the invention is not limited to the details of the illustrated embodiments, and may be otherwise embodied.

The principle of the present invention is applicable to various types of ocular lenses irrespective of the applications and materials. For instance, the present invention is applicable to hard contact lenses and soft contact lenses. The hard contact lenses include a non-rigid gas permeable type formed of PMMA, for example, and a rigid gas permeable type (RGP). The soft contact lenses include a hydrophilic or hydrated type and a hydrophobic type. Obviously, the present invention is applicable to intraocular lenses.

The ocular lens according to the present invention may be produced by any known methods. For instance, the ocular lens is produced by first cutting a lens blank to provide a precursor of an intended lens, and then shaping or forming the inner and outer surfaces of the precursor by a suitable cutting or machining operation. The ocular lens may be formed by a molding operation using a pair of molds which respectively give intended inner and outer surfaces of the lens. Alternatively, one of the opposite surfaces of the ocular lens is formed by molding while the other surface is formed by cutting. Further, a molded lens blank may be subjected to a cutting operation to form the desired inner and outer surface configurations. When the ocular lens is formed by cutting, the surfaces of the obtained ocular lens have a high degree of accuracy of configuration. When the ocular lens is formed by molding, the ocular lens can be produced with high efficiency. By combining the cutting operation and the molding operation, the ocular lens can be produced with high efficiency while assuring high accuracy of the surface configuration.

While the contact lenses according to the illustrated embodiments which have been described are the simultaneous vision type, the multifocal ocular lens of the present invention is also used as a translating vision type ocular lens, by suitably determining the offset distance of the optical center axis of the vision correction area from the geometric center axis of the lens, and the sizes of the respective vision correction regions. For instance, such a translating vision type ocular lens includes a vision correction area consisting of a central circular first intermediate-distance vision correction region formed at its center, a distant vision correction region, and a near vision correction region. Each of the distant and near vision correction regions has a semi-annular shape extending over a circumferential distance corresponding to a half of the circumference of the first intermediate-distance vision correction region, so that the semi-annular distant and near vision correction regions cooperate to surround the central first intermediate-distance vision correction region. This ocular lens employs a suitable rotation preventive mechanism such as a prism ballast mechanism. The thus formed ocular lens is used as the translating vision type ocular lens, wherein the near vision correction region is located below a horizontal line passing the first intermediate-distance vision correction region, and the distant vision correction region is located above the horizontal line. When the visual axis of the lens wearer who wears the thus formed translating vision type ocular lens is directed downwards while reading a book, for instance, a relatively wide area of the pupil of the wearer's eye is covered by the near vision correction region and the first intermediate-distance vision correction region, so that the wearer can obtain clear images of the relatively near object (book) and objects at an intermediate distance between the near and far distances to which the optical power values of the near and distant vision correction regions are respectively tuned. When the visual axis of the lens wearer is directed frontwards while driving a car, for instance, a relatively wide area of the pupil is covered by the distant vision correction region and the first intermediate-distance vision correction region, so that the wearer can obtain clear images of the far objects and the intermediate objects.

In the illustrated embodiments, a pair of inner and outer annular vision correction regions 16, 18 are formed radially outwardly of the central circular first intermediate-distance vision correction region 14. However, a plurality of pairs of inner and outer annular vision correction regions each having a suitable radial width may be formed, such that the inner and outer vision correction regions 16, 18 are alternately arranged in the radial direction of the lens.

In the illustrated embodiments of FIGS. 1–9, the contact lens includes a single constant-power section 20 formed in the central (first) intermediate-distance vision correction region 14. However, the central intermediate-distance vision correction region 14 may include a plurality of constant-power sections 20, as shown in the graph of FIG. 12 by way of example. In the embodiment of FIG. 12, the central first intermediate-distance vision correction region 14 consists of a radially inner central circular first constant-power section 20a and a radially outer annular second constant-power section 20b, which have respective different optical power values Pa1 and Pa2. In this case, it is preferable that the optical power value Pa1 of the radially inner first constant-power section 20a be made closer to the optical power Pb of the radially inner vision correction region 16, than the optical power value Pa2 of the radially outer second constant-power section 20b. More preferably, the optical power Pa1 of the first constant-power section 20a is made closer to the optical power Pb of the inner vision correction region 16, than to the optical power Pc of the outer vision correction region 18, while the optical power Pa2 of the second constant-power section 20b is made closer to the optical power Pc than to the optical power Pb. The plurality of constant-power sections provided in the central intermediate-distance vision correction region 14 permit enhanced visual acuity of objects at respective intermediate distances to which the optical power values Pa of the respective constant-power sections are tuned.

In either of the case where the central first intermediate-distance vision correction region 14 include the single constant-power section and the case where the vision correction region 14 includes the two or more constant-power sections, the optical power value Pa of each constant-power section is selected to be intermediate between the optical power values Pb and Pc of the near and distant vision correction regions 16, 18. When the contact lens includes the second intermediate-distance vision correction region 22, the optical power of the second intermediate-distance vision correction region 22 is determined to be held within a range between those of the near and distant vision correction regions 16, 18 so that the contact lens advantageously assures a high degree of visual acuity of the objects at the intermediate distance while avoiding the ghosting or double imaging problem.

In the illustrated embodiments, the optical power of the second intermediate-distance vision correction region 22 continuously varies from the optical power value Pb of the inner annular vision correction region 16 to the optical power value Pc of the outer annular vision correction region 18. Like the central circular first intermediate-distance vision correction region 14, the annular second intermediate-distance vision correction region 22 may include at least one constant-power section each having a desired constant intermediate optical power value over a suitable radial distance.

It is to be understood that the present invention is not limited to the details of the illustrated embodiments, but may be embodied with various changes, modifications and improvements, which may occur to those skilled in the art, without departing from the scope of the invention defined in the attached claims.

As is apparent from the above description, the multifocal ocular lens constructed according to the present invention includes a central intermediate-distance vision correction region whose optical power is held within a range between the respective different optical power values of the near and distant vision correction regions, which are formed radially outwardly of the central intermediate-distance vision correction region. The ocular lens having the central intermediate-distance vision correction region assures improved visual acuity of objects at an intermediate distance between the near and far distances, owing to the optical characteristics of the central intermediate-distance vision correction region, while effectively preventing the ghosting or double imaging problem. Further, the present ocular lens prevents or minimizes deterioration of the visual acuity which would be caused by displacement of the lens during its use on the user's eye.

What is claimed is:

1. A multifocal ocular lens having a vision correction area including at least one distant vision correction region having a first optical power value for distant vision correction and at least one near vision correction region having a second optical power value for near vision correction, characterized in that:
said vision correction area further includes a central intermediate-distance vision correction region which has a third optical power value for intermediate vision correction between said first and second optical power values and which is located in a central portion of said vision correction area such that said distant and near vision correction regions are located radially outwardly of said central intermediate-distance vision correction region, said central intermediate-distance vision correction region including at least one constant-power section whose optical power value is constant and intermediate between said first and second optical power values and a varying-power section which is located radially outwardly of said at least one constant-power section and whose optical power value continuously varies in a radial direction from the optical power value of a radially outermost one of said at least one constant power section to one of said first and second optical power values of a corresponding one of said distant and near vision correction regions, which corresponding one is located adjacent to said varying-power section.

2. A multifocal ocular lens according to claim 1, wherein said first optical power value of said distant vision correction region and said second optical power value of said near vision correction region are both constant in a radial direction of said ocular lens.

3. A multifocal ocular lens according to claim 1, wherein said vision correction area has an optical center axis with which centers of said central intermediate-distance vision correction region and said distant and near vision correction regions are aligned.

4. A multifocal ocular lens according to claim 1, wherein said at least one constant-power section includes a central constant-power section having a center located on an optical center axis of said central intermediate-distance vision correction region.

5. A multifocal ocular lens according to claim 1, wherein said at least one constant-power section consists of a single central circular constant-power section which has center located on an optical center axis of said central intermediate-distance vision correction region and which has a radius of 0–3 mm.

6. A multifocal ocular lens according to claim 1, wherein a distribution of the optical power value of said varying-power section of said central intermediate-distance vision correction region in a radial direction of the lens is represented by one polynomial equation of the second or higher order.

7. A multifocal ocular lens according to claim 1, wherein said varying-power section of said central intermediate-distance vision correction region has a radial dimension of 0.1–2.0 mm.

8. A multifocal ocular lens according to claim 1, wherein said central intermediate-distance vision correction region and said distant and near vision correction regions are concentric with each other, having a common optical center axis, and said at least one constant-power section consists of a single central circular constant-power section aligned with said common optical center axis, said varying-power section consisting of an annular section located radially outwardly of and adjacent to said single central circular constant-power section, and wherein said optical power value y of said varying-power section at a radial distance x from said common optical center axis is represented by the following equation:

$$y=E1(x^3/3-x^2(Wa+Wb)/2+x \cdot Wa \cdot Wb)+F1$$

wherein, $$E1=(Pa-Pb)/((Wa^3-Wb^3)/3-(Wa^2-Wb^2)(Wa+Wb)/2+(Wa-Wb)Wa \cdot Wb)$$

$$F1=(Pa-E1(Wa^3/3-Wa^2(Wa+Wb)/2+Wa \cdot Wa \cdot Wb)$$

Pa: said optical power value of said single central circular constant-power section, Pb: an optical power value of a radially inner one of said distant and near vision correction regions, which is located radially outwardly of and adjacent to said central intermediate-distance vision correction region, Wa: a radial distance from said optical center axis to a boundary between said single central circular constant-power section and said varying-power section of said central intermediate-distance vision correction region, and Wb: a radial distance from said common optical center axis to a boundary between said central intermediate-distance vision correction region and said radially inner one of said distant and near vision correction regions.

9. A multifocal ocular lens according to claim 1, wherein said optical power value y of said varying-power section of said central intermediate-distance vision correction region at a radial distance x from said common optical center axis is represented by one of the two following equations:

$$y=(Pb-Pa)(x-Wa)^4/(Wb-Wa)^4+Pa,$$

and $$y=(Pa-Pb)(x-Wb)^4/(Wb-Wa)^4+Pb$$

wherein

Pa: said optical power value of said single central circular constant-power section, Pb: an optical power value of a radially inner one of said distant and near vision correction regions, which is located radially outwardly of and adjacent to said central intermediate-distance vision correction region, Wa: a radial distance from said optical center axis to a boundary between said single central circular constant-power section and said varying-power section of said central intermediate-distance vision correction region, and Wb: a radial distance from said common optical center axis to a boundary between said central intermediate-distance vision correction region and said radially inner one of said distant and near vision correction regions.

10. A multifocal ocular lens according to claim 1, wherein said distant and near vision correction regions are formed radially outwardly of and concentrically with said central intermediate-distance vision correction region, and said at least one constant-power section consists of a single central constant-power section which has a center located on an optical center of said central intermediate-distance vision correction region and whose optical power value is closer to the optical power value of a radially outer one of said distant and near vision correction regions, than to the optical power value of the other radially inner one of said distant and near vision correction regions, which other radially inner one is located radially outwardly of and adjacent to said central intermediate-distance vision correction region.

11. A multifocal ocular lens according to claim 1, wherein said optical center axis of said vision correction area is offset from a geometrical center axis of said ocular lens by a distance of not larger than 2.0 mm.

12. A multifocal ocular lens according to claim 1, wherein either one of opposite surfaces of said ocular lens has a toric portion corresponding to said vision correction area.

13. A multifocal ocular lens having a vision correction area including at least one distant vision correction region having a first optical power value for distant vision correction and at least one near vision correction region having a second optical power value for near vision correction, characterized in that:

said vision correction area further includes a central intermediate-distance vision correction region which has a third optical power value for intermediate vision correction between said first and second optical power values and which is located in a central portion of said vision correction area such that said distant and near vision correction regions are located radially outwardly of said central intermediate-distance vision correction region, said central intermediate-distance vision correction region consisting of a single central varying-power section whose optical power continuously varies in a radial direction from a first extreme value at an optical center axis of said vision correction area, to a second extreme value which is the optical power value of a radially inner one of said distant and near vision correction regions, said first extreme value being closer to the optical power value of the other radially outer one of said distant and near vision correction regions.

14. A multifocal ocular lens according to claim 13, wherein said first optical power value of said distant vision correction region and said second optical power value of said near vision correction region are both constant in a radial direction of said ocular lens.

15. A multifocal ocular lens according to claim 13, wherein said vision correction area has an optical center axis with which centers of said central intermediate-distance vision correction region and said distant and near vision correction regions are aligned.

16. A multifocal ocular lens according to claim 13, wherein said optical center axis of said vision correction area is offset from a geometrical center axis of said ocular lens by a distance of not larger than 2.0 mm.

17. A multifocal ocular lens according to claim 13, wherein either one of opposite surfaces of said ocular lens has a toric portion corresponding to said vision correction area.

18. A multifocal ocular lens having a vision correction area including at least one distant vision correction region having a first optical power value for distant vision correction and at least one near vision correction region having a second optical power value for near vision correction, characterized in that:

said vision correction area further includes a central intermediate-distance vision correction region which has a third optical power value for intermediate vision correction between said first and second optical power values and which is located in a central portion of said vision correction area such that said distant and near vision correction regions are located radially outwardly of said central intermediate-distance vision correction region, said central intermediate-distance vision correction region includes at least one constant-power section whose optical power value is constant and intermediate between said first and second optical power values, said distant and near vision correction regions are formed radially outwardly of and concentrically with said central intermediate-distance vision correction region, and said at least one constant-power section consists of a single central constant-power section which has a center located on an optical center of said central intermediate-distance vision correction region and whose optical power value is closer to the optical power value of said distant vision correction regions, than to the optical power value of said near vision correction regions, said near vision correction region being located radially outwardly of and adjacent to said central intermediate-distance vision correction region, and said distant vision correction region have said first optical power value Pc (Dptr.) and being located radially outwardly of said near vision correction region having said second optical power value Pb (Dptr.) which is a sum of said first optical power value Pc and an additional value ADD (Dptr.), the optical power value Pa (Dptr.) of said single central constant-power section of said central intermediate-distance vision correction region being determined so as to satisfy the following formula:

$$Pc+0.25 \leq Pa \leq Pc+ADD/2.$$

19. A multifocal ocular lens according to claim 18, wherein said first optical power value of said distant vision correction region and said second optical power value of said near vision correction region are both constant in a radial direction of said ocular lens.

20. A multifocal ocular lens according to claim 18, wherein said vision correction area has an optical center axis with which centers of said central intermediate-distance vision correction region and said distant and near vision correction regions are aligned.

21. A multifocal ocular lens according to claim 18, wherein said at least one constant-power section includes a central constant-power section having a center located on an optical center axis of said central intermediate-distance vision correction region.

22. A multifocal ocular lens according to claim 18, wherein said at least one constant-power section consists of a single central circular constant-power section which has a center located on an optical center axis of said central intermediate-distance vision correction region and which has a radius of 0–3 mm.

23. A multifocal ocular lens according to claim 18, wherein said vision correction area has an optical center axis which is offset from a geometrical center axis of said ocular lens by a distance of not larger than 2.0 mm.

24. A multifocal ocular lens according to claim 18, wherein either one of opposite surfaces of said ocular lens has a toric portion corresponding to said vision correction area.

25. A multifocal ocular lens having a vision correction area including at least one distant vision correction region having a first optical power value for distant vision correction and at least one near vision correction region having a second optical power value for near vision correction, characterized in that:

said vision correction area further includes a central intermediate-distance vision correction region which has a third optical power value for intermediate vision correction between said first and second optical power values and which is located in a central portion of said vision correction area such that said distant and near vision correction regions are located radially outwardly of said central intermediate-distance vision correction region, said central intermediate-distance vision correction region including at least one constant-power section whose optical power value is constant and intermediate between said first and second optical power values, said distant and near vision correction regions are formed radially outwardly of and concentrically with said central intermediate-distance vision correction region, and said at least one constant-power section of said central intermediate-distance vision correction region includes a radially inner first constant-power section and a radially outer second constant-power section which have respective different optical power values, the optical power value of said radially inner first constant-power section being closer to the optical power value of a radially inner one of said distant and near vision correction regions, than the optical power value of said radially outer second constant-power section.

26. A multifocal ocular lens according to claim 25, wherein said first optical power value of said distant vision correction region and said second optical power value of said near vision correction region are both constant in a radial direction of said ocular lens.

27. A multifocal ocular lens according to claim 25, wherein said vision correction area has an optical center axis with which centers of said central intermediate-distance vision correction region and said distant and near vision correction regions are aligned.

28. A multifocal ocular lens according to claim 25, wherein said at least one constant-power section includes a central constant-power section having a center located on an optical center axis of said central intermediate-distance vision correction region.

29. A multifocal ocular lens according to claim 25, wherein said inner constant-power section comprises a central circular constant-power section which has a center located on an optical center axis of said central intermediate-distance vision correction region and which has a radius of 0–3 mm.

30. A multifocal ocular lens according to claim 25, wherein said optical center axis of said vision correction area is offset from a geometrical center axis of said ocular lens by a distance of not larger than 2.0 mm.

31. A multifocal ocular lens according to claim 25, wherein either one of opposite surfaces of said ocular lens has a toric portion corresponding to said vision correction area.

32. A multifocal ocular lens having a vision correction area including at least one distant vision correction region having a first optical power value for distant vision correction and at least one near vision correction region having a second optical power value for near vision correction, characterized in that:

said vision correction area further includes a central intermediate-distance vision correction region which has a third optical power value for intermediate vision correction between said first and second optical power values and which is located in a central portion of said vision correction area such that said distant and near vision correction regions are located radially outwardly of said central intermediate-distance vision correction region, and said distant and near vision correction regions are formed radially outwardly of and concentrically with said central intermediate-distance vision correction region which functions as a first intermediate-distance vision correction region, and said vision correction area further includes a second intermediate-distance vision correction region which is interposed between said distant and near vision correction regions and which has a fourth optical power value between said first and second optical power values.

33. A multifocal ocular lens according to claim 32, wherein said first optical power value of said distant vision correction region and said second optical power value of said near vision correction region are both constant in a radial direction of said ocular lens.

34. A multifocal ocular lens according to claim 32, wherein said vision correction area has an optical center axis with which centers of said central intermediate-distance vision correction region and said distant and near vision correction regions are aligned.

35. A multifocal ocular lens according to claim 32, wherein said fourth optical power value of said second intermediate-distance vision correction region continuously varies in a radial direction of said vision correction area from said first optical power value to said second optical power value.

36. A multifocal ocular lens according to claim 32, wherein a distribution of said fourth optical power value of said second intermediate-distance vision correction region in a radial direction of the lens is represented by one polynomial equation whose order is not smaller than 2.

37. A multifocal ocular lens according to claim 32, wherein said first intermediate-distance vision correction region, said distant and near vision correction regions and said second intermediate-distance vision correction region are concentric with each other, having a common optical center axis, and wherein said fourth optical power value y of said second intermediate-distance vision correction region at a radial distance x from said common optical center axis is represented by the following equation:

$$y = E2(x^3/3 - x^2(Wc+Wd)/2 + x \cdot Wc \cdot Wd) + F2$$

wherein, $$E2 = (Pb-Pc)/((Wc^3-Wd^3)/3 - (Wc^2+Wd^2)(Wc+Wd)/2 + (Wc-Wd)Wc \cdot Wd)$$

$$F2 = Pb - E2(Wc^3/3 Wc^2(Wc+Wd)/2 + Wc \cdot Wc \cdot Wd)$$

Pb: an optical power value of a radially inner one of said distant and near vision correction regions, which is located radially outwardly of and adjacent to said first intermediate-distance vision correction region, Pc: an optical power value of the other radially outer one of said distant and near vision correction regions, which is located radially outwardly of and adjacent to said second intermediate-distance vision correction region, and Wc: a radial distance from said optical center axis to a boundary between said radially inner one of said distant and near vision correction regions and said second intermediate-distance vision correction region, and Wd: a radial distance from said optical center axis to a boundary between said second intermediate-distance vision correction region and said radially outer one of said distant and near vision correction regions.

38. A multifocal ocular lens according to claim 32, wherein said second intermediate-distance vision correction region has a radial dimension of 0.1–2.0 mm.

39. A multifocal ocular lens according to claim 32, wherein said optical center axis of said vision correction area is offset from a geometrical center axis of said ocular lens by a distance of not larger than 2.0 mm.

40. A multifocal ocular lens according to claim 32, wherein either one of opposite surfaces of said ocular lens has a toric portion corresponding to said vision correction area.

41. A multifocal ocular lens having a vision correction area including at least one distant vision correction region having a first optical power value for distant vision correction and at least one near vision correction region having a second optical power value for near vision correction, characterized in that:

said vision correction area further includes a central intermediate-distance vision correction region which has a third optical power value for intermediate vision correction between said first and second optical power values and which is located in a central portion of said vision correction area such that said distant and near vision correction regions are located radially outwardly of said central intermediate-distance vision correction region, and said vision correction area has an optical center axis which is offset from a geometrical center axis of said ocular lens by a distance of not larger than 2.0 mm.

42. A multifocal ocular lens having a vision correction area including at least one distant vision correction region having a first optical power value for distant vision correction and at least one near vision correction region having a second optical power value for near vision correction, characterized in that:

said vision correction area further includes a central intermediate-distance vision correction region which has a third optical power value for intermediate vision correction between said first and second optical power values and which is located in a central portion of said vision correction area such that said distant and near vision correction regions are located radially outwardly of said central intermediate-distance vision correction region, and either one of opposite surfaces of said ocular lens has a toric portion corresponding to said vision correction area.

\* \* \* \* \*